US012158218B2

(12) United States Patent
Sands et al.

(10) Patent No.: US 12,158,218 B2
(45) Date of Patent: Dec. 3, 2024

(54) VALVE TESTING (71) Applicant: Baker Hughes Oilfield Operations LLC, Houston, TX (US)

(72) Inventors: Neil Stewart Sands, Leicester (GB); Oyindamola Dada, Leicester (GB)

(73) Assignee: Baker Hughes Oilfield Operations LLC, Houston, TX (US)

( * ) Notice: Subject to any disclaimer, the term of this patent is extended or adjusted under 35 U.S.C. 154(b) by 427 days.

(21) Appl. No.: 17/523,010

(22) Filed: Nov. 10, 2021

(65) Prior Publication Data

US 2022/0178467 A1    Jun. 9, 2022

Related U.S. Application Data (60) Provisional application No. 63/121,298, filed on Dec. 4, 2020.

(51) Int. Cl.
*F16K 37/00* (2006.01)
*B64D 13/02* (2006.01)

(52) U.S. Cl.
CPC .......... *F16K 37/0083* (2013.01); *B64D 13/02* (2013.01); *F16K 37/0091* (2013.01)

(58) Field of Classification Search
CPC .................................................. F16K 37/0083
USPC .......................................................... 73/1.72
See application file for complete search history.

(56) References Cited

U.S. PATENT DOCUMENTS

2018/0106698 A1*  4/2018  Karg ................... F16K 37/0091
2020/0072373 A1*  3/2020  Noboa .................. F16K 31/046

OTHER PUBLICATIONS

Yamashita, Yoshiyuki. "An automatic method for detection of valve stiction in process control loops." Control Engineering Practice 14.5 (2006): 503-510. (Year: 2006).*

* cited by examiner

*Primary Examiner* — Walter L Lindsay, Jr.
*Assistant Examiner* — Philip T Fadul
(74) *Attorney, Agent, or Firm* — Mintz, Levin, Cohn, Ferris, Glovsky and Popeo, P.C.

(57) ABSTRACT

A method is provided. The method can be used to perform valve testing for pneumatic valves. The method can include receiving, by a pressure controller including a data processor, data cauterizing an air flow through a valve coupled to the pressure controller. The method can also include determining, by the data processor, valve operation data associated with the valve. The method can further include providing, by the data processor, the valve operation data in a display coupled to the pressure controller. The valve operation data can include an opening point of the valve, a closing point of the valve, or an indication of stiction of the valve. The valve operation data can also be determined based on a rate of pressure change through the valve. Related systems and computer readable mediums performing the method are also provided.

18 Claims, 5 Drawing Sheets

VALVE TESTING

RELATED APPLICATION

This application claims priority under 35 U.S.C. § 119(e) to U.S. Provisional Application No. 63/121,298, filed Dec. 4, 2020, the entire contents of which are hereby expressly incorporated by reference herein.

BACKGROUND

Valves, particularly, pneumatically operated valves, can be used to compensate for pressure differences that can exist between two environments to which the valve interfaces. It can be desirable to inspect and monitor valve operation to assess the performance, safety, and maintenance requirements of the valves, as well as the machinery, such as an aircraft, in which the valves may be configured.

SUMMARY

In an aspect, a method for performing valve testing is provided. In one embodiment, the method can include receiving, by a pressure controller including a data processor, data characterizing an air flow through a valve coupled to the pressure controller. The method can also include determining, by the data processor, valve operation data associated with the valve. The method can further include providing, by the data processor, the valve operation data in a display coupled to the pressure controller.

A variety of embodiments can be provided. In another embodiment, the method can include receiving data characterizing a rate of pressure change through the valve. In another embodiment, determining the valve operation data can include determining an opening point of the valve and providing the valve operation data includes providing the opening point of the valve. In another embodiment, determining the valve operation data can include determining a closing point of the valve and providing the valve operation data includes providing the closing point of the valve. In another embodiment, determining the valve operation data can include determining an indication of stiction of the valve and providing the valve operation data includes providing an indication of stiction of the valve.

In another embodiment, the valve can be a pneumatic valve. In another embodiment, the pneumatic valve can be a cabin pressure valve configured in an aircraft. In another embodiment, the valve operation data can be determined based on a control pressure received at the pressure controller. In another embodiment, providing the valve operation data can include providing a first plot in the display. The first plot can indicate an amount of air flow through the valve with respect to a constant rate of pressure change. In another embodiment, providing the valve operation data can include providing a second plot in the display. The second plot can indicate valve operation with respect to a fixed flow demand of the valve.

In another aspect a system for valve testing is provided. In an embodiment, the system can include a valve, a pressure controller coupled to the valve, and a computing device coupled to the pressure controller. The computing device can include a memory, a data processor and a display. The data processor can be configured to execute instructions stored in the memory, which when executed cause the data processor to perform operations including receiving, by the pressure controller, flow data characterizing an air flow through a valve coupled to the pressure controller. The operations can also include determining valve operation data associated with the valve based on the received data. The operations can further include providing the valve operation data in the display.

A variety of embodiments can be provided. In another embodiment, the system can include a pressure and vacuum source coupled to the pressure controller. In another embodiment, the data processor can be further configured to receive pressure data characterizing a rate of pressure change supplied to the valve via the pressure and vacuum source. In another embodiment, determining the valve operation data can include determining the valve operation data can include determining, by the data processor, an opening point of the valve and providing, by the data processor the valve operation data can include providing the opening point of the valve. In another embodiment, determining the valve operation data can include determining, by the data processor, a closing point of the valve and providing, by the data processor, the valve operation data can include providing the closing point of the valve. In another embodiment, determining the valve operation data can include determining, by the data processor, an indication of stiction of the valve and providing, by the data processor, the valve operation data can include providing an indication of stiction of the valve.

In another embodiment, the valve can be a pneumatic valve. In another embodiment, the pneumatic valve is a cabin pressure valve configured in an aircraft. In another embodiment, pressure controller can be a pitot static tester. In another embodiment, providing the valve operation data can include providing, by the data processor, a first plot in the display indicating an amount of air flow through the valve with respect to a constant rate of pressure change.

Non-transitory computer program products (i.e., physically embodied computer program products) are also described herein that store instructions, which when executed by one or more data processors of one or more computing systems, causes at least one data processor to perform operations herein. Similarly, computer systems are also described herein that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, a radio link, or the like.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Valves, such as pneumatic valves can be configured to mitigate pressure differences in a variety of industrial applications. Pneumatic valves are commonly used in aircraft with pressurized cabins. Control valves and safety valves can regulate the amount of pressure within the aircraft to prevent over pressurization of the interior of the aircraft.

A common technique for determining valve operation is to manually assess operation of a valve using manual pressure controllers and/or sensors, to visually verify that the valve is opening, and closing as designed without stiction. Stiction is an amount of static friction that must be overcome to enable a valve to open or close as intended. Stiction can be considered a threshold in that an amount of force is required to overcome static friction in order for the valve to open or close. Manual inspection and assessment of valve operation can require an operator to visually monitor the valve and a sensor, such as a mechanical altimeter. Human inspectors may be unfamiliar with the configuration of the valve or valve testing system, which can lengthen the time necessary to perform inspection procedures. Manual inspection is also prone to error. For example, the human inspector may not adequately determine a valve opening point due inability to sufficiently view the valve operation and sensor data simultaneously. Accordingly, manual inspection and monitoring of valves can be time-consuming, error-prone, and cost-prohibitive.

As described herein, a pressure controller can be coupled to a valve, and can be configured to provide a constant flow demand or a constant pressure rate of change. The pressure controller can be configured to monitor the actual flow and/or the pressure rate of change present at the valve. The pressure controller can be further configured to identify an opening point and a closing point of the valve. The valve opening and closing points can be provided to a user via a computing device and/or a display coupled to the pressure controller. The pressure controller described herein can be further configured to provide graphical trend data illustrating irregularities in a flow curve and/or a pressure curve associated with the valve so that potential failure conditions can be identified to a user viewing the display.

The improved valve testing system described herein provides precise and automatic opening and closing point detection for valves without requiring manual testing equipment or personnel. Feedback related to the magnitude of valve stiction can also be provided to enable early detection of valve operating problems, unsafe operational conditions, and/or hazardous conditions in which the valve may configured to operate.

The systems and methods described herein provide a pressure controller configured to automatically detect the start and end of a valve's opening, the start and end of a valve's closing, the linearity and hysteresis associated with the valve movement. In some embodiments, the pressure controller can include a pitot static tester, also known as an Air Data Test Set (ADTS). The ADTS can be configured to provide necessary support functions for measuring the opening and closing points of a valve. The systems, and methods described herein for testing valve operation can provide more accurate, reliable, and reproducible valve test results than can be achieved using manual valve testing.

Embodiments of the present disclosure describe systems and methods for determining an opening point, a closing point, and an indication of stiction in a pneumatic valve, such as a cabin pressure valve configured in an aircraft. However, it can be understood that embodiments of the disclosure can be employed for inspecting and monitoring operational characteristics of any valve where volume changes occur within a pilot side of a system as the valve opens and closes without limit.

Figure 1:
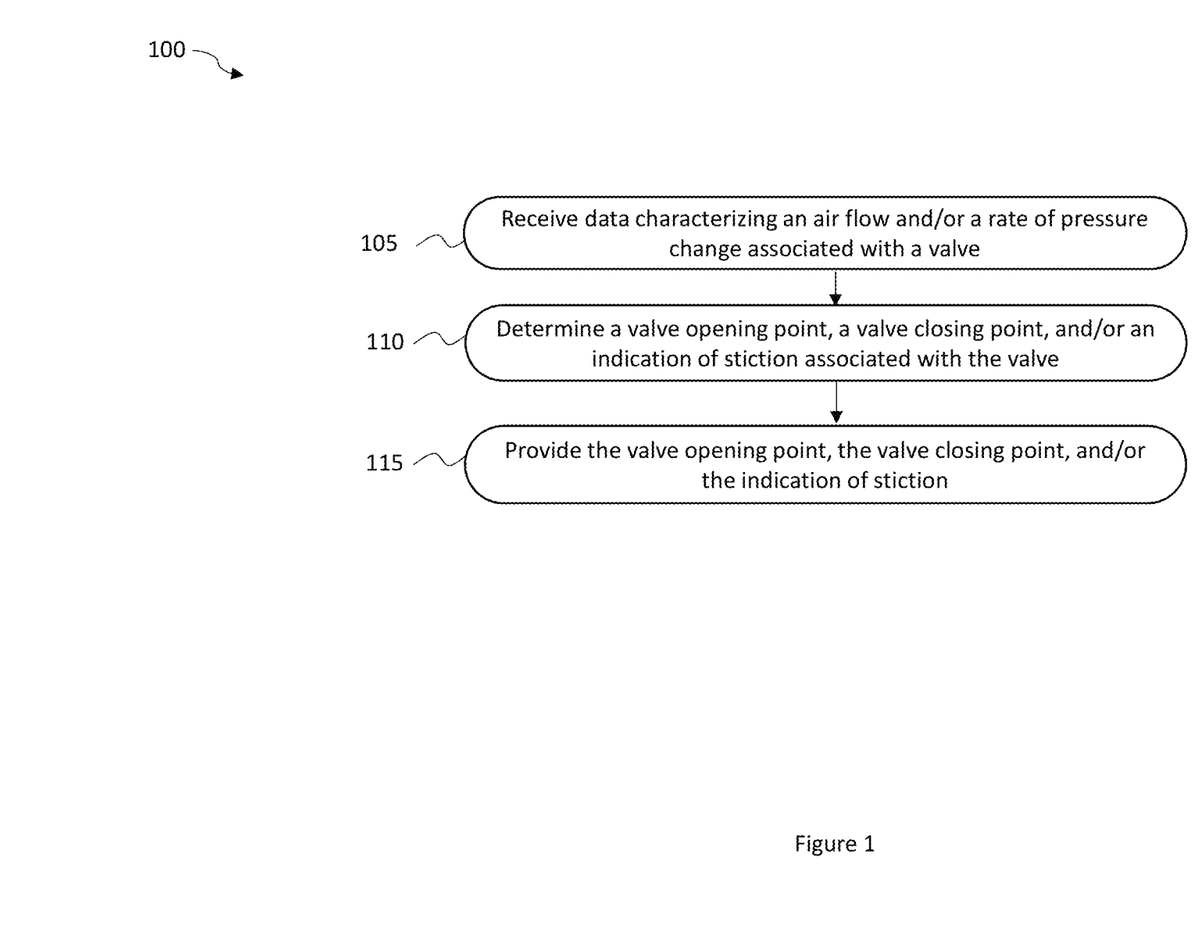
FIG. 1 is a flow diagram illustrating one embodiment of a method for determining a valve opening point, a valve closing point, and/or an indication of stiction associated with a valve as described herein.

FIG. 1 is a flow diagram illustrating one embodiment of a method for determining a valve opening point, a valve closing point, and/or an indication of stiction associated with a valve as described herein. As shown in FIG. 1, the method 100 includes operations 105-115. However, it can be understood that, in alternative embodiments, one or more of these operations can be omitted and/or performed in a different order than illustrated.

In operation 105, data characterizing an air flow and/or a rate of pressure change can be received. The data can be received by a pressure controller coupled to the valve at which the air flow and rate of pressure change are present. The data can include time-series data of current valve operation or can include historical data associated with a past operation of the valve. In some embodiments, the data can be received from a computing device coupled to the pressure controller, such as from a memory or a database configured on a remote computing device.

In operation 110, a valve opening point, a valve closing point, and/or an indication of stiction associated with the valve can be determined. Such valve operation data and measurements can be determined by the pressure controller described herein or via a computing device coupled to the pressure controller. Valve testing can be performed with respect to a constant pressure rate of change, and/or a fixed flow demand. In some embodiments, a pressure signal can be oscillated or varied over time to allow continuous movement of the valve across an entire opening range and an entire closing range. In some embodiments, valve operation testing can be based on the valve type fitted for leak testing.

Opening point can be determined by a user or can be a predefined variable above the standard flow or pressure rate without the movement of the valve. The flow must exceed the threshold to trigger the opening point. For example, for constant pressure rate mode, if the nominal flow rate is 15 cc/min and the user threshold is 1 cc, the operating point can be calculated as 16 cc/min. The opening of the valve can be detected when the flow is greater than 16 cc/min. Note the actual change in flow rate may be positive or negative depending on the configuration of the valve under test.

Closing point can be determined by a user or can be a predefined variable above the standard flow or pressure rate without the movement of the valve. The flow must reduce below the threshold to trigger the closing point. For example, for constant pressure rate mode, if the nominal flow rate is 15 cc/min and the user threshold is 1 cc, the operating point can be calculated as 16 cc/min. The closing of the valve can be detected when the flow is less than 16 cc/min. Note the actual change in flow rate may be positive or negative depending on the configuration of the valve under test.

Stiction can be determined by a user or predefined variable above the opening flow or pressure. For example, in constant pressure rate mode, if the opening threshold is 16 cc/min and the user stiction threshold is 3 cc, the stiction point will be calculated as 19 cc/min. Excessive valve stiction can be detected when the flow is greater that 19 cc/min. The actual change in flow rate may be positive or negative depending on the configuration of the valve under test. Another parameter that can be used to detect stiction is a user defined or a predefined limit on rate of change of flow or pressure where the valve opens. A combination of both methods can be used.

In operation 115, the valve operation data including the valve opening point, the valve closing points, and/or indications of stiction associated with the valve can be provided. In some embodiments the providing can include storing the valve operation data in a memory of the pressure controller and/or a computing device coupled to the pressure controller, or displaying the valve operation data in a graphical user interface (GUI) configured in a display of the pressure controller and/or a computing device coupled to the pressure controller. The providing can also include automatically triggering or causing execution of alarm, alert, or notification functionality to inform operators of the system that the valve may be operating in a compromised or malfunctioning state. In some embodiments, the valve operation data can be provided in textual reports in addition to, or in place of graphical provisions of the data. The valve data can also be used to determine trends of the valve performance over time, as well as the ability to interface with aircraft onboard diagnostic routines.

Figure 2:
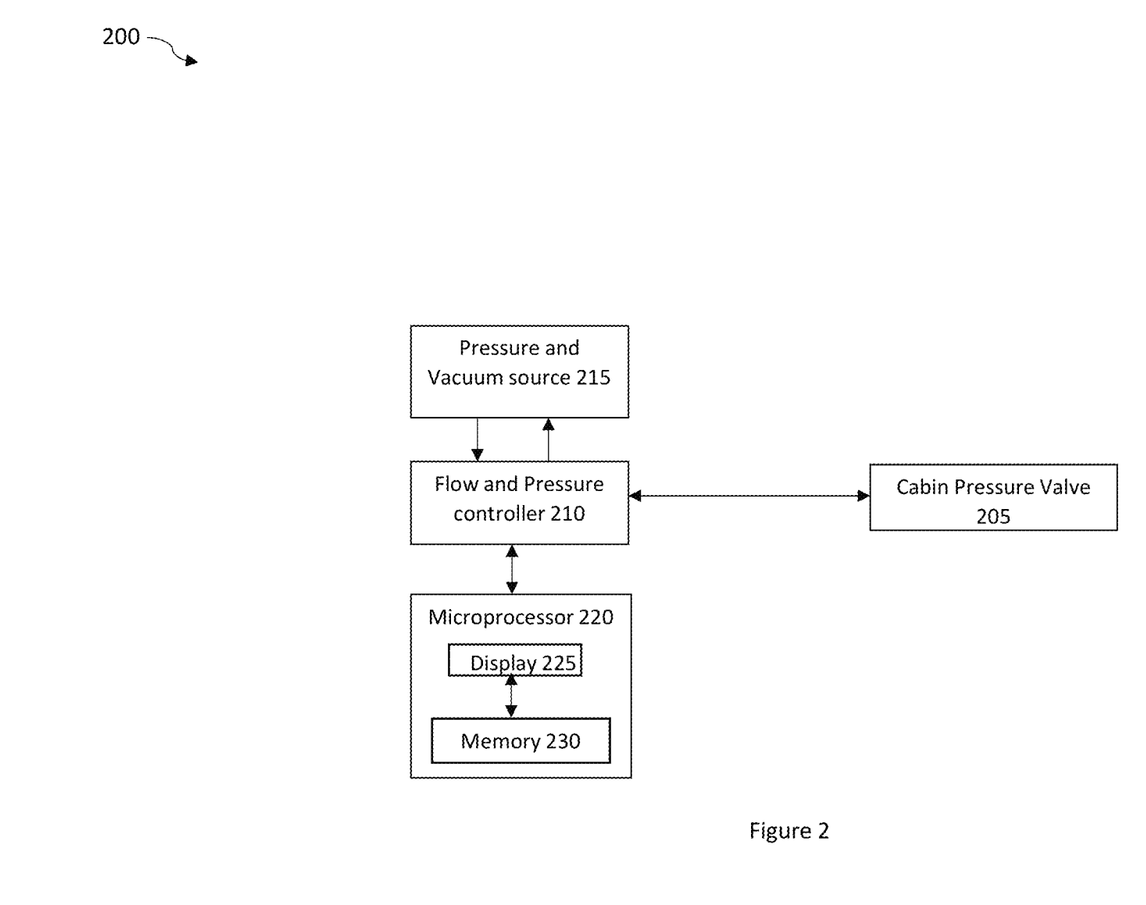
FIG. 2 is a diagram illustrating one embodiment of a system for valve testing as described herein.

FIG. 2 is a diagram illustrating one embodiment of a system for valve testing as described herein. The system 200 shown in FIG. 2 includes a valve 205, such as cabin pressure valve 205 fluidically coupled to a flow and pressure controller 210. The flow and pressure controller 210 can be fluidically and communicatively coupled to a pressure and vacuum source 215. The flow and pressure controller 210 can be communicatively coupled to a computing device 220, such as microprocessor 220. The computing device 220 can be configured with a display 225 to provide valve operation data to an operator of the system and/or to a computing device communicatively coupled to computing device 220 via a network, such as a local area network, a virtual private network connected to the internet, or via a radio link. The computing device 220 can also include a memory 230 storing computer-readable, executable instructions configured to perform the methods described herein. In some embodiments, the memory 230 can store received valve operation data, provided valve operation data, and thresholds associated with the valve operation data.

Figure 3:
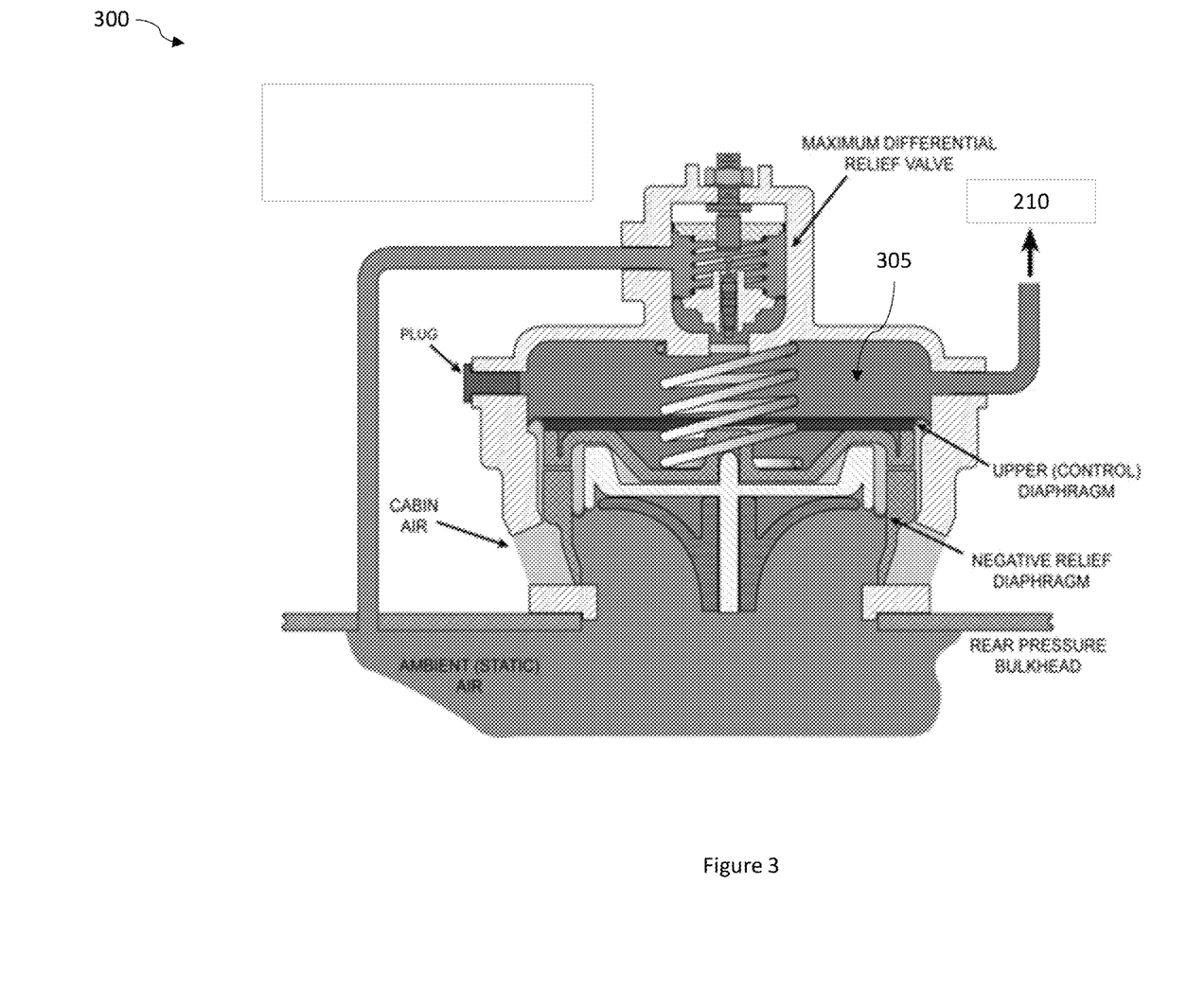
FIG. 3 is a diagram illustrating one embodiment of a valve which can be automatically tested using the systems and methods described herein.

The valve 205 can include a cabin pressure valve, such as the valve 300 shown in FIG. 3. The valve 300 can be positioned between an aircraft cabin interior and the ambient atmosphere. For example, as shown in FIG. 3, the valve 300 can be located within a rear pressure bulkhead. The valve 300 can include a pilot valve, such as a maximum differential relief valve, which can receive a pilot supply of ambient air. In response to pilot valve modulation, the seat of the valve 300 can open or close to maintain a desired pressure of the cabin air. The valve 300 can include an upper or control diaphragm against which control pressure can be exerted. The control pressure can be provided to the flow and pressure controller 210, shown in FIG. 2. The valve opening point, closing point, and indications of stiction can be determined by way of the control pressure 305 received at the flow and pressure controller 210. This can be applied to any pilot operated valve that has a volume change during opening and closing operation of the valve.

Returning to FIG. 2, the system 200 can include a pressure and vacuum source 215. The pressure and vacuum source 215 can be configured to provide the flow and pressure controller 210 with a constant pressure ramp so that the pressure and rate of pressure change caused by movement of the valve can be measured. In this way, the valve opening point, the valve closing point, and any indication of stiction can be observed and measured by the flow and pressure controller 210. In some embodiments, the pressure controller can include a pitot static tester, also known as an Air Data Test Set (ADTS). The ADTS can be configured to provide necessary support functions for measuring the opening and closing points of a valve. The valve operation data, such as the valve opening point, the valve closing point, and any indication of stiction can be transmitted to the microprocessor 220 for further processing, and/or storage. The valve operation can be provided via the display 225.

Figure 4:
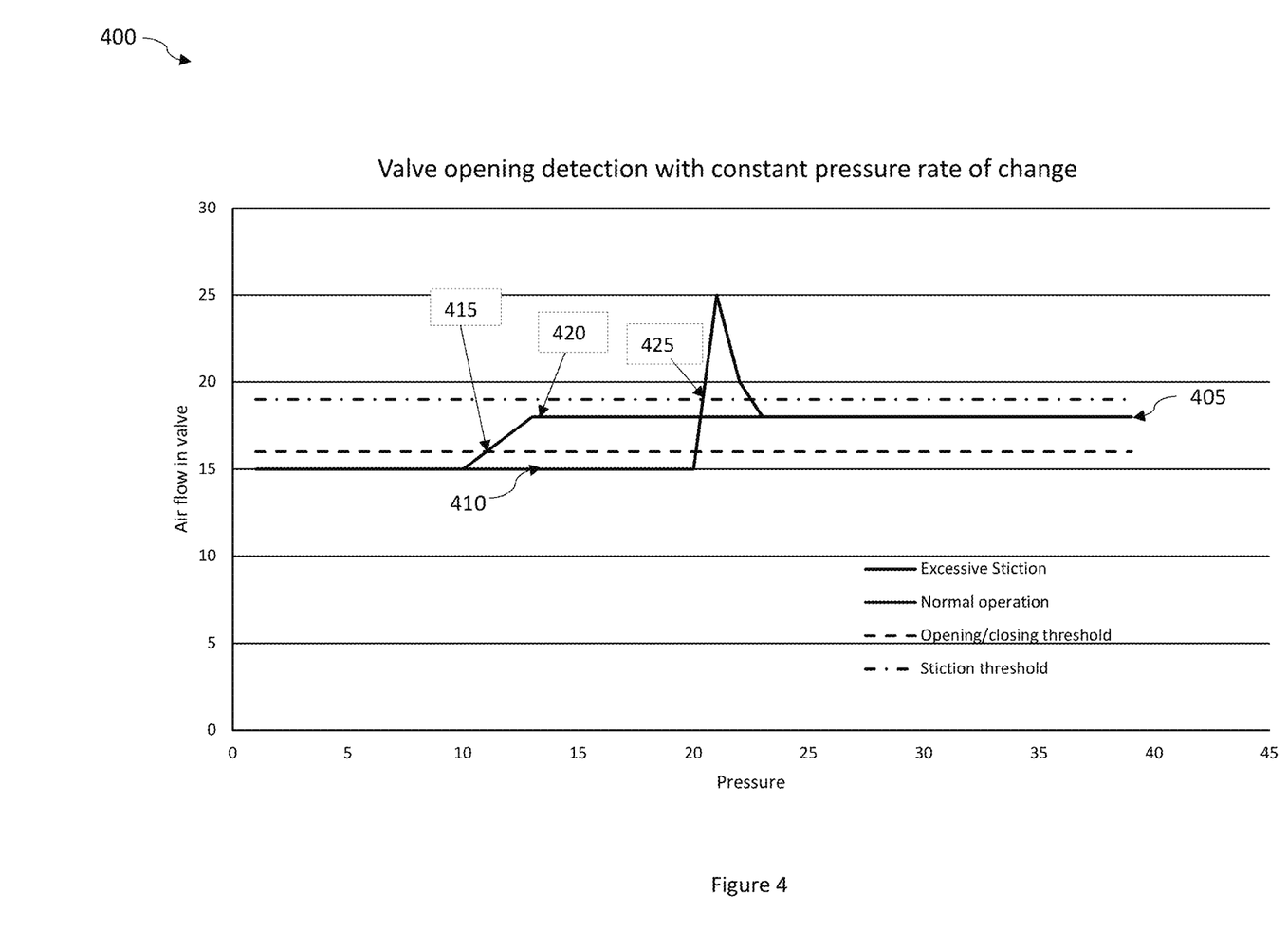
FIG. 4 is a plot illustrating opening valve movement detection with constant rate of change of pressure via the systems and methods described herein.

FIG. 4 is a plot 400 illustrating valve opening detection with constant rate of change of pressure via the systems and methods described herein. The plot 400 can be provided in the display 225 and can include the valve operation data. As shown in FIG. 4, the amount of air flow in the valve can be indicative of valve movement and can be plotted with respect to a constant pressure rate of change. The plot 400 can include indications of normal operation 405 and stiction 410. At 415, the valve starts to open as flow increases due to volume changes. At 420, the valve has fully opened. Indication of stiction can be observed at 425, where there is no change in flow at the expected opening point followed by a larger flow observed at a higher pressure than the expected pressure at which the valve opens under normal operation.

Figure 5:
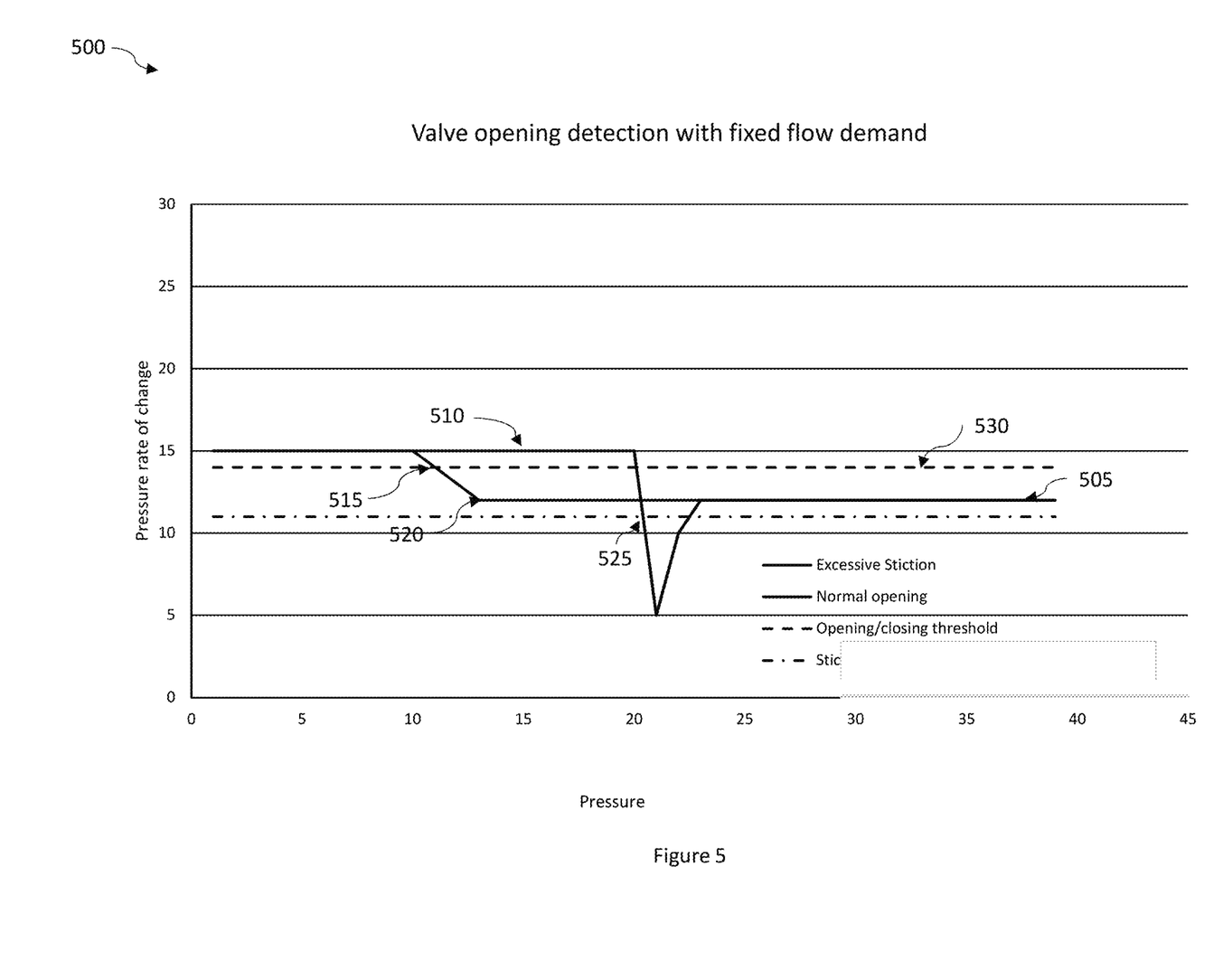
FIG. 5 is a plot illustrating valve opening detection with fixed flow demand via the systems and methods described herein.

FIG. 5 is a plot 500 illustrating valve opening detection with fixed flow demand via the systems and methods described herein. The plot 500 can be provided in the display 225 and can include the valve operation data. In some embodiments, a constant flow demand can be used to determine valve operation data with respect to a threshold 530. For example, if the flow is too large to test the valve under a constant pressure rate of change, then the pressure change can be observed with respect to a constant flow demand. As shown in FIG. 5, indications of normal valve operation 505 and stiction 510 can be plotted. At 515, the valve starts to open as rate of change of pressure decreases due to volume changes. At 520, the valve has fully opened. Indication of stiction can be observed at 525, where there is no change in rate of change of pressure at the expected opening point 515 followed by a larger rate of change of pressure observed at a higher pressure than the expected pressure at which the valve opens under normal operation.

Exemplary technical effects of the methods, systems, and devices described herein include, by way of non-limiting example improved monitoring and detection of valve operation, such as valve opening, valve closing, and stiction present within the valve. The methods, systems, and devices described herein can automatically determine valve operation data in real-time and reduce the need for manual inspection and testing of valves. As a result, valve testing can be performed more reliably tracked over time providing increased testing accuracy, and improved valve maintenance and repair planning. The methods, systems, and devices described herein enable creation of a digital history of valve operation for use in diagnosing valve failures and predicting the occurrence of new failures. The methods, systems, and devices described herein enable automated data collection and more accurate analysis of valve operation data compared to manual testing systems and methods. In addition, the methods, systems, and devices described herein provide improved graphical user interfaces for displaying valve operation data in a dynamic, real-time, streaming manner thereby enhancing operator assessment and interpretation of valve testing results.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
   receiving, by a pressure controller including a data processor, data characterizing an air flow through a valve coupled to the pressure controller;
   determining, by the data processor, valve operation data associated with the valve; and
   providing, by the data processor, the valve operation data in a display coupled to the pressure controller, wherein providing the valve operation data includes providing a first plot in the display, the first plot indicating an amount of air flow through the valve with respect to a constant rate of pressure change.

2. The method of claim 1, further comprising receiving data characterizing a rate of pressure change through the valve.

3. The method of claim 1, wherein determining the valve operation data includes determining an opening point of the valve and providing the valve operation data includes providing the opening point of the valve.

4. The method of claim 1, wherein determining the valve operation data includes determining a closing point of the valve and providing the valve operation data includes providing the closing point of the valve.

5. The method of claim 1, wherein determining the valve operation data includes determining an indication of stiction of the valve and providing the valve operation data includes providing an indication of stiction of the valve.

6. The method of claim 1, wherein the valve is a pneumatic valve.

7. The method of claim 6, wherein the pneumatic valve is a cabin pressure valve configured in an aircraft.

8. The method of claim 1, wherein the valve operation data is determined based on a control pressure received at the pressure controller.

9. The method of claim 1, wherein providing the valve operation data includes providing a second plot in the display, the second plot indicating valve operation with respect to a fixed flow demand of the valve.

10. A system comprising:
    a valve;
    a pressure controller coupled to the valve; and
    a computing device, including a memory, a data processor and a display, coupled to the pressure controller, wherein the data processor is configured to execute instructions stored in the memory, which when executed cause the data processor to perform operations including
       receiving, by the pressure controller, flow data characterizing an air flow through a valve coupled to the pressure controller;
       determining valve operation data associated with the valve based on the received data; and
       providing the valve operation data in the display, wherein providing the valve operation data includes providing a first plot in the display indicating an amount of air flow through the valve with respect to a constant rate of pressure change.

11. The system of claim 10, further comprising a pressure and vacuum source coupled to the pressure controller.

12. The system of claim 11, wherein the data processor is further configured to receive pressure data characterizing a rate of pressure change supplied to the valve via the pressure and vacuum source.

13. The system of claim 10, wherein determining the valve operation data includes determining, by the data processor, an opening point of the valve and providing, by the data processor, the valve operation data includes providing the opening point of the valve.

14. The system of claim 10, wherein determining the valve operation data includes determining, by the data processor, a closing point of the valve and providing, by the data processor, the valve operation data includes providing the closing point of the valve.

15. The system of claim 10, wherein determining the valve operation data includes determining, by the data processor, an indication of stiction of the valve and providing, by the data processor, the valve operation data includes providing an indication of stiction of the valve.

16. The system of claim 10, wherein the valve is a pneumatic valve.

17. The system of claim 16, wherein the pneumatic valve is a cabin pressure valve configured in an aircraft.

18. The system of claim 10, wherein the pressure controller is a pitot static tester.

* * * * *